United States Patent [19]

Dybro et al.

[11] Patent Number: 5,642,916
[45] Date of Patent: Jul. 1, 1997

[54] LOCKING AND TENSIONING FOR A SLIDABLE SEAT

[75] Inventors: Niels Dybro, Utica; Mark C. Woydick, Romeo, both of Mich.

[73] Assignee: AlliedSignal Inc., Morristown, N.J.

[21] Appl. No.: 517,883

[22] Filed: Aug. 22, 1995

[51] Int. Cl.⁶ .............................. B60N 2/42; B60R 21/00
[52] U.S. Cl. .................... 297/216.18; 296/68.1; 297/216.17
[58] Field of Search .................... 297/216.1, 216.17, 297/216.18, 478, 480; 296/68.1

[56] References Cited

U.S. PATENT DOCUMENTS

| | | | |
|---|---|---|---|
| 2,117,932 | 5/1938 | Anker | 297/216.18 |
| 3,832,000 | 8/1974 | McDonnell | 296/68.1 |
| 3,988,028 | 10/1976 | Satzinger | 297/216.18 X |
| 4,159,120 | 6/1979 | Fohl | 296/68.1 X |
| 4,488,754 | 12/1984 | Heasch et al. | 297/216.18 |
| 4,792,158 | 12/1988 | Andersson | 297/480 |
| 5,533,775 | 7/1996 | Cyliax | 296/68.1 |

FOREIGN PATENT DOCUMENTS 1432698  4/1976  United Kingdom ................. 296/68.1

*Primary Examiner*—Peter R. Brown
*Attorney, Agent, or Firm*—Markell Seitzman

[57] ABSTRACT

A safety system comprising: an occupant seat (10) having a seating portion (12) and bracket device (28, 30) for slidably supporting the seat portion such that the seat is permitted to freely move in a fore and an aft direction in response to forces imparted thereto; and a restraint device (50,54), for tensioning a flexible member (42) operated attached to the seat and for restraining the seat during an emergency from moving forward from a pre-emergency position.

3 Claims, 4 Drawing Sheets

LOCKING AND TENSIONING FOR A SLIDABLE SEAT

BACKGROUND AND SUMMARY OF THE INVENTION

The present invention relates generally to a restraint system that has general application to slidable, non-fixed vehicular seats.

The typical seat used in many large trucks or in other heavy vehicle applications is shown in FIG. 1. This seat 10 comprises a seat portion 12 and a back portion 14. The seat is movable vertically as well as horizontally. The seating surface is supported by a support structure generally shown as 20 having a crossbar construction 22, a lower frame 24 secured to the floor 26 of the vehicle and an upper frame member 28. Those skilled in the art will recognize that the crossbars are slidable within the frames 24 and 28. The upper frame member 28 defines part of a track to loosely receive a track portion 30 secured to the seat. In this way the seat 10 is slidably mounted relative to the support 20. In many automotive applications a typical seat can be moved fore and aft by a motorized or mechanical system. Once moved the seat is locked in its new position. This is not the case in large truck type seating applications in which the seat is not fixed in the horizontal direction (see arrow 27) and is free to move or oscillate plus or minus 2.5, 5.0 or more centimeters in response to the inertial forces and occupant forces imparted thereto.

As mentioned above, the seat is also vertically adjustable. Typically these seats include an air spring generally shown as 31 connected between the two crossbars or frame portions 24 and 28 and a small shock absorber 32 to provide damping to prevent excessive oscillation (see arrow 33) of the seat during an accident. The air spring is connected to a source of pressurized air to permit the vertical movement of the seat under operator control. The seat is tethered to the floor 26 of the vehicle by one or more tethers 34a and 34b attached to the rear sides of the seat portion 12. Typically these tethers are lengths of seat belt material. As can be appreciated, these tethers are only effective during an emergency to restrain the forward motion of the seat if the seat is in its most forward position and the tether 34a and 34b are relatively taut. A deficiency in this type of system is that a larger sized driver or occupant of the vehicle will typically position the seat rearward of that position used by a smaller occupant or driver. With the seat in this more aft position, and as illustrated in FIG. 1, the tethers 34a and b are not taut but have slack. During a frontal collision this occupant may not be fully protected as the seat will first move forward due to the inertial forces generated during the crash and will not be restrained until the tethers 34a and b are pulled taut. Further, as can be appreciated, the seat 10 as well as the occupant are susceptible to higher acceleration loading and resulting impact forces since the seat 10 is permitted to move forward due to the limited restraint potential of this type of system.

It is an object of the present invention to provide a system to restrict the forward motion of the seat structure during a crash regardless of position of the seat prior to the crash. A further object of the invention is to provide a device which will eliminate any slack in a flexible retaining member linked to the seat or to pre-load the flexible member subsequent to a crash to more retain the seat in a rearward position.

Accordingly, the invention comprises: a safety system comprising: an occupant seat having a seating portion and first means for slidable supporting the seat portion such that the seat is permitted to freely move in a fore and an aft direction in response to forces imparted thereto; and first restraint means, maintaining a flexible member in a taut condition as the seat is moved fore and aft and activated during an emergency for restraining the seat from moving forward from a pre-emergency position. The flexible member is joined at one end to a structural part of the seat and at another end to a tensioning means for maintaining the flexible member in a generally taut condition as the seat is moved fore and aft. In one embodiment of the invention the tensioning means includes a spring loaded, rotary spool having the flexible member wound thereabout and means, activated during an emergency, for preventing the protraction of the flexible member from the spool. In another embodiment the tensioning means includes a linear acting spring loaded piston. Still in another embodiment a pretensioning device is used to eliminate any slack in the flexible member and to also move the seat rearward and maintain the seat in its moved position.

Many other objects and purposes of the invention will be clear from the following detailed description of the drawings.

DETAILED DESCRIPTION OF THE DRAWINGS

Figure 1:
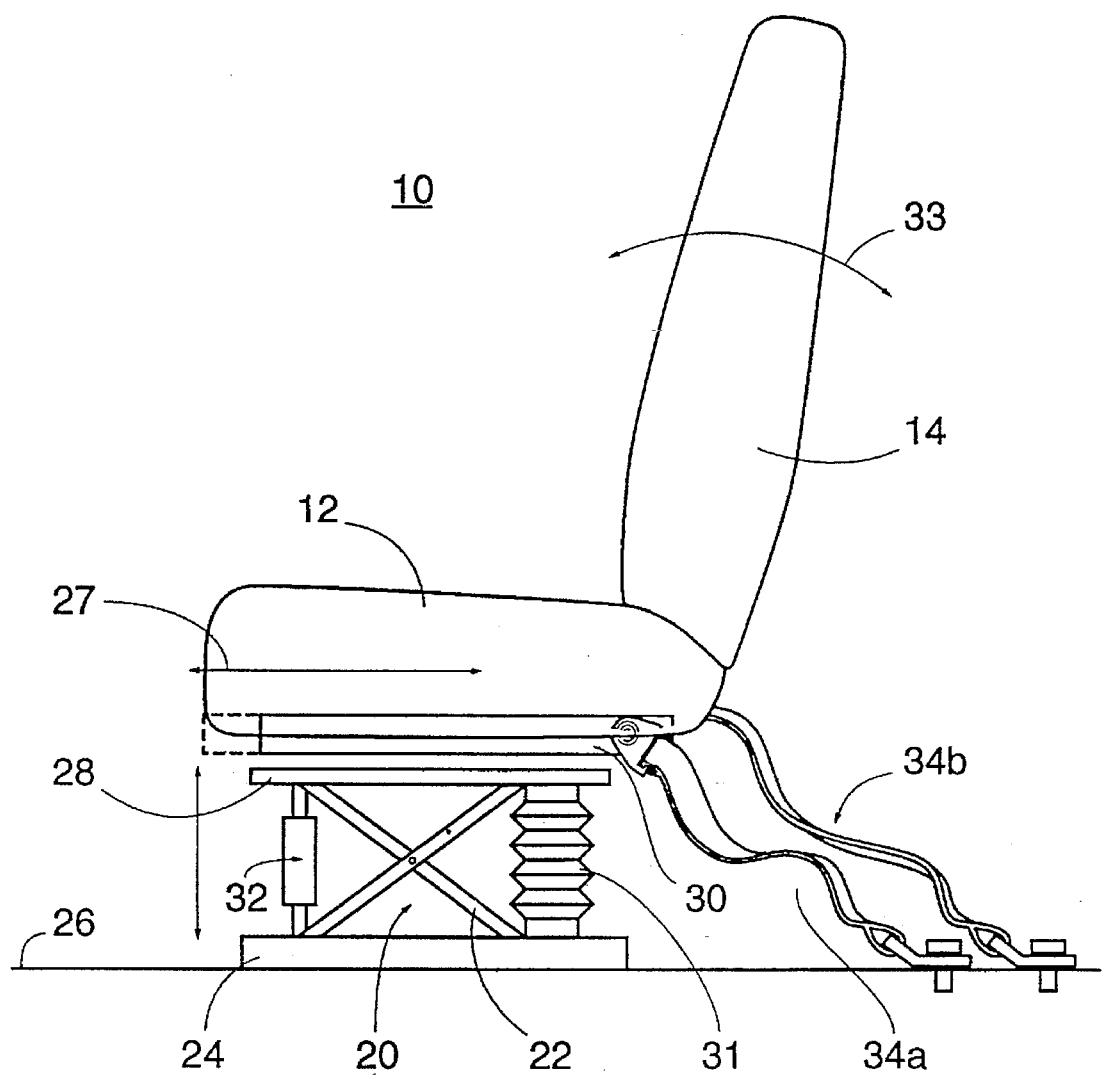
FIG. 1 is illustrative of a prior art truck seat.
Figure 2:
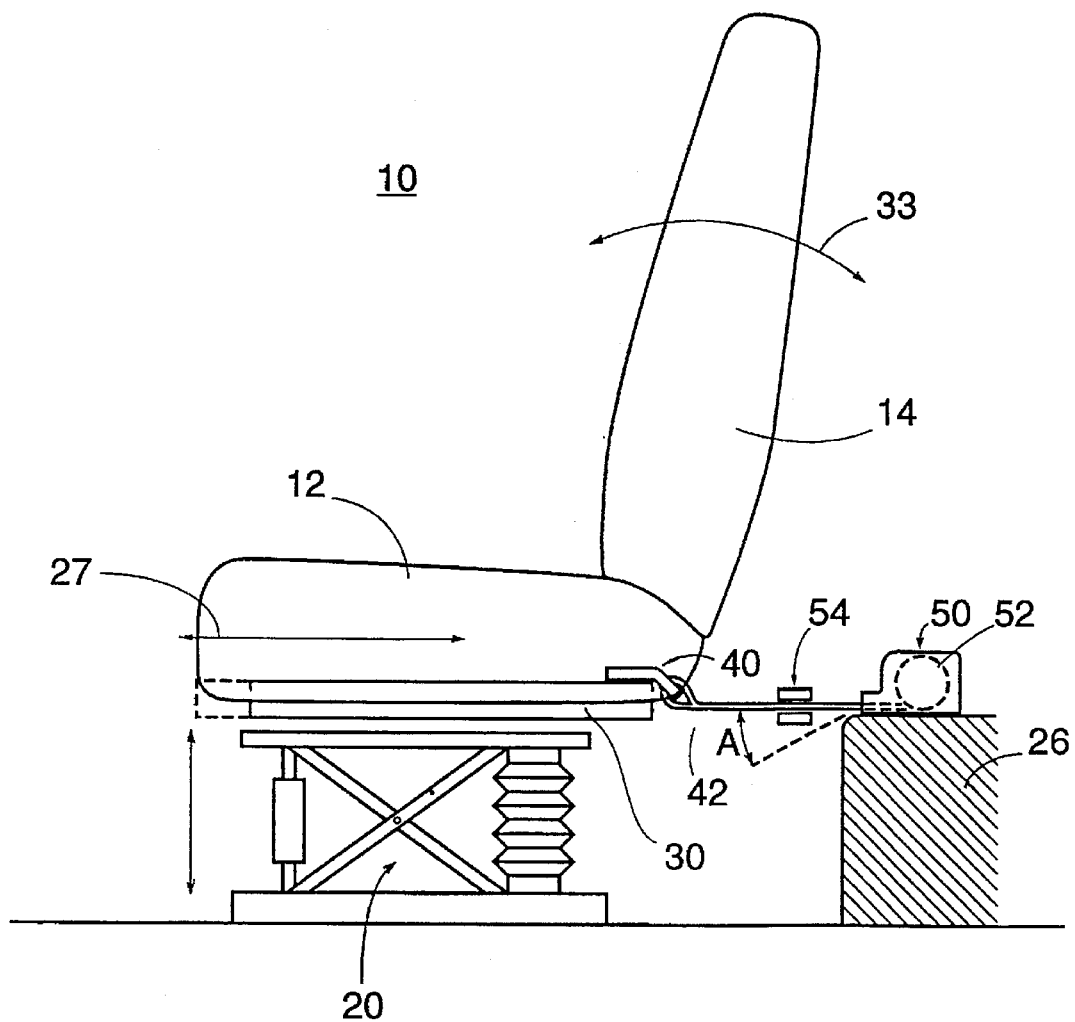
FIG. 2 illustrates a view of the present invention.
Figure 3:
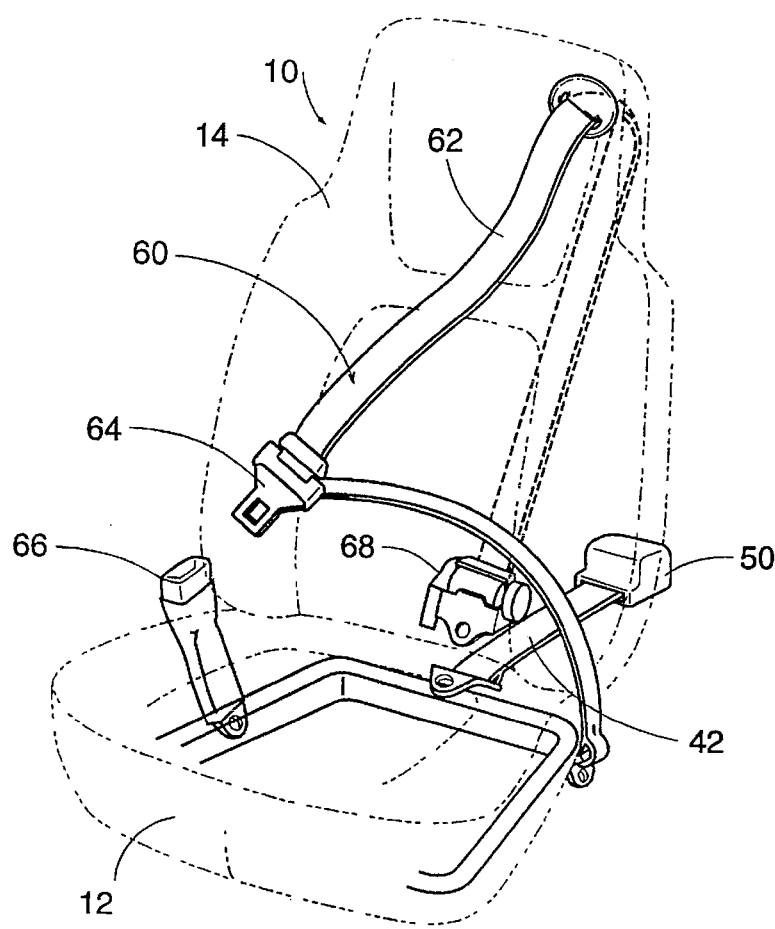
FIG. 3 illustrates a passenger restraint system incorporated within the seat.

Reference is made to FIG. 2 which illustrates the present invention. Secured to a reinforced portion of the seat 12 such as part of the seat frame near the bottom 40 of the seat portion 12 or to the track 30 is a flexible member 42. The flexible member is connected to a tensioning device generally shown as numeral 50. The device 50 is preferably mounted relative to the floor and to the seat 10 such that the angle, A, that the flexible member 12 makes with the horizontal is between zero and 45 degrees. As can be appreciated, regardless of the mounting height of device 50 the angle A will vary as the seat 10 is vertically adjustable. In the preferred embodiment of the invention the tensioning device 50 is mounted at a height generally equal to the nominal seat height. However, the tensioning device may be mounted higher or lower than shown. Of course it can be appreciated that the present invention will work within any mounting range from zero to 90 degrees. The purpose of the tensioning device 50 is to keep the flexible member taut at all times regardless of the unrestrained position of the seat and also to provide a means for preventing the extension of the flexible member such that the seat will remain generally in its pre-crash position. At a minimum the device includes a tightening means 52 such as a spring loaded reel or spool about which the flexible member 42 such as a cable or seat belt 42 is wound and a means 54 for clamping the flexible member in place or preventing the reel from further rotation. As can be appreciated the tightening means always maintains the flexible member taut. In one embodiment of the invention as illustrated in FIG. 3, the tightening means comprises a seat belt retractor 100 such as the one illustrated in European patent document EP 0 228 729. The retractor illustrated in this document includes both a web sensor and a vehicle sensor which causes the locking of a toothed wheel when the webbing is protracted at a rate increase in excess of a predetermined level or when the vehicle is decelerated in excess of another predetermined level. The web sensor can be eliminated if desired. As can be seen from the above, a rewind spring associated with the retractor keeps the webbing taut regardless of the fore/aft and up/down position of the seat. During an emergency, the retractor spool is locked thereby preventing the protraction of the webbing to maintain the seat in its pre-crash position. As illustrated in FIG. 3 the seat 10 additionally includes a second restraint system 60 the purpose of which is to restrain the occupant to the seat. This system shows a seat belt integrated within the seat comprising a seat belt 62, tongue 64 engagable with buckle 66 mounted to a structural part of the seat and an emergency locking retractor 68.

Figure 4:
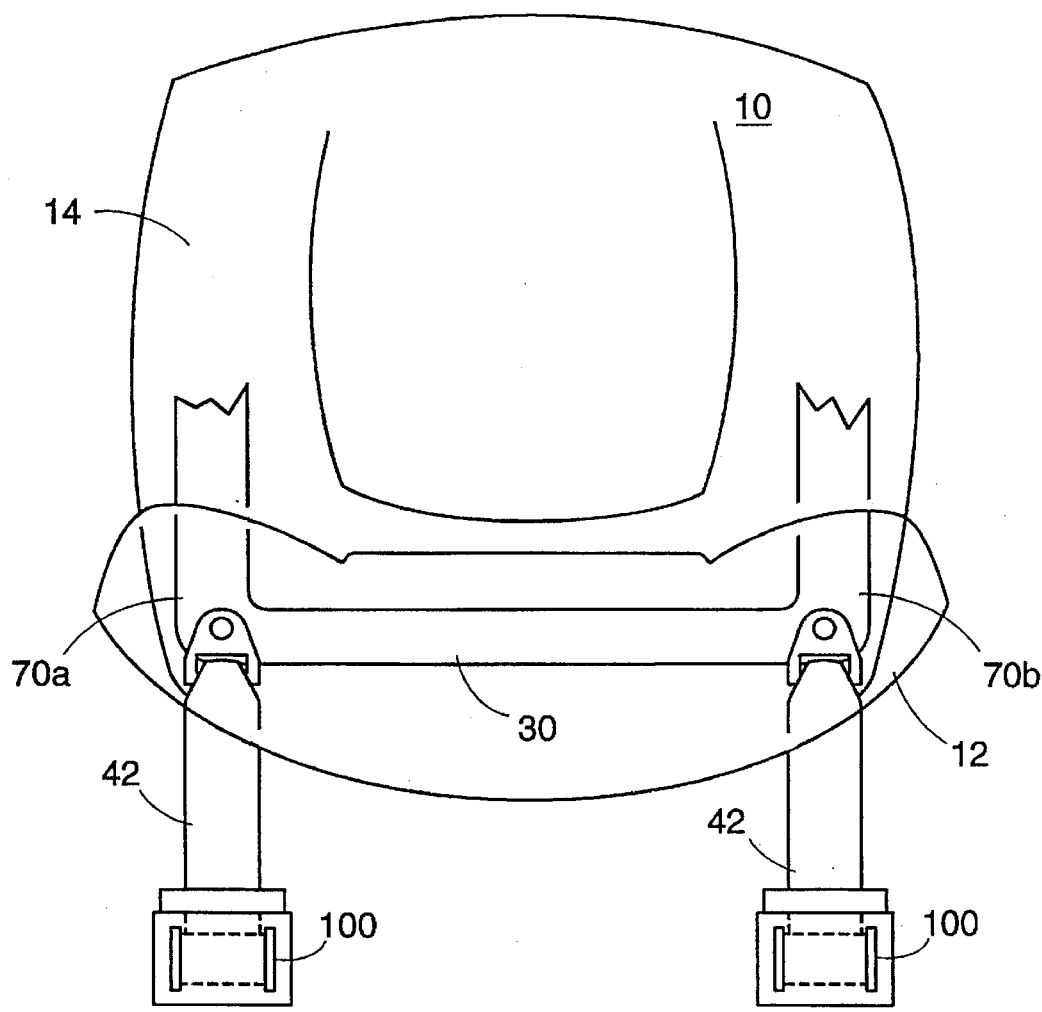
FIG. 4 illustrates show an embodiment using two retractors are seat restraint devices.

Reference is briefly made to FIG. 4 which illustrates two retractors 100, each connected to a rear corner 70a or 70b of the seat 10. The utilization of this dual retractor concept will prevent any tendency of the seat 10 from rotating about a vertical axis.

As can be appreciated the seat belt 42 linking the seat and the retractor 100 can be replaced by any structurally sound flexible member including a reinforced, woven material cable as well as a wire cable.

Figure 5:
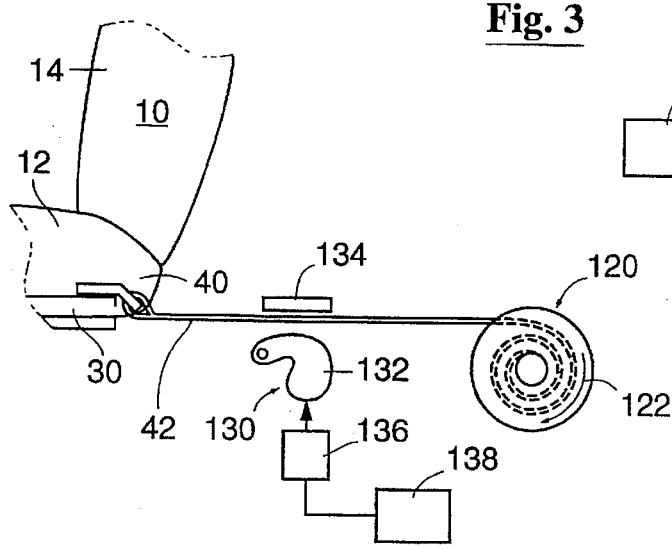
FIG. 5 illustrates an alternate embodiment of the invention.

The retractor 100 or tensioning device generally can be mechanically actuated or electrically actuated to prevent protraction of the flexible member or rotation of the reel or spool. Reference is again briefly made to FIG. 5 which illustrates a portion of the rear bottom 40 of the seat 10 joined to a take-up device conceptually shown as a spring-loaded spool 120 having a rewind spring 122. Positioned forward of the spool 120 is a clamping device 130 comprising an articulated arm 132, a backing plate 134 and solenoid 136. Upon receipt of a signal indicative of a crash generated by a crash sensor or electronic control unit 138, the solenoid 136 is activated moving the member 132 toward engagement with the backing plate 134 thereby clamping the flexible member therebetween to prevent the further protraction of this member. As mentioned above the flexible member can be a cable, a seat belt, or other similar functioning device.

Figure 6:
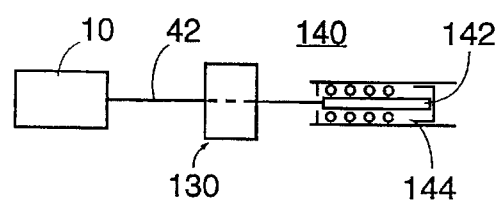
FIG. 6 illustrates another embodiment of the invention.

Reference is briefly made to FIG. 6 which illustrates a further modification of the present invention. Shown in block form is the clamping device 140, however, the spring-loaded take-up spool has been replaced by a piston 142 axially loaded by a linear spring 144. The spring 144 lightly and outwardly biases the piston 142 and flexible member 42 such as cable or seat belt. The piston is axially moveable to the right and to the left, as shown in FIG. 6 as the vehicle seat 10 slides upon its tracks 28/30. During an emergency the clamping device 130 clamps the cable or seat belt in its pre-crash position.

Figure 7:
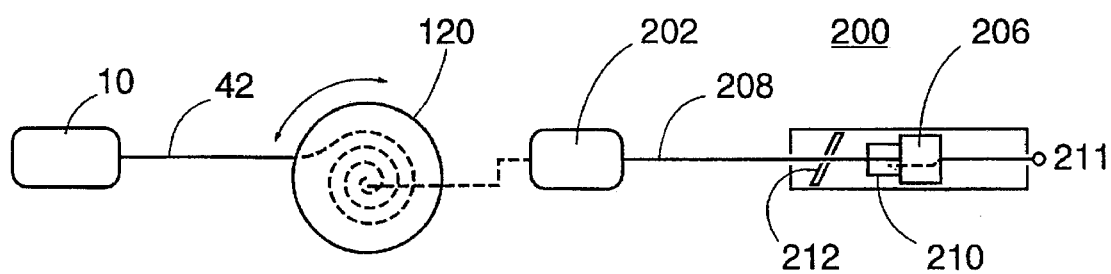
FIG. 7 shows another embodiment of the invention.

FIG. 7 shows another alternative embodiment of the invention in which a pretensioner is used. In this embodiment the spring loaded spool or reel 120 biased by a return spring to maintain the flexible member 42 taut is connected to a pretensioning device 200 through a clutch 202 of known type. Specifically the pretensioning device includes a tube 204 having a piston 206 slidably received therein. The piston 206 is connected to the clutch 202 by a wire cable 208. Positioned adjacent the piston is a quantity of pyrotechnic material 210 which when activity by a control signal received at terminal 211, indicative of an accident generates products of combustion propelling the piston down the tube. Secured about the cable 208 is a locking device such as a locking ellipse 212. Prior to the accident the spring loaded spool keeps the flexible member taut regardless of the position of the slidable seat 10. During an accident the pyrotechnic material is activated propelling the piston 206 and the locking ellipse 210 down the tube. As the cable is pulled shoes or rollers associated with the clutch 202 move into engagement with a portion of the spool 120 reverse rotating the spool. This action is directly transferred to the seat whereby the seat is pulled rearward. As the accident develops the forward motion of the occupant and the seat are prevented by the locking ellipse as it bites into the interior of the tube.

Many changes and modifications in the above described embodiment of the invention can, of course, be carried out without departing from the scope thereof. Accordingly, that scope is intended to be limited only by the scope of the appended claims.

We claim:

1. A safety system comprising: an occupant seat (10) having a seat cushion (12) and a back rest (14) and support means (28,30) adapted to be mounted to a floor of a vehicle for locating the seat at an elevated position above the floor and for supporting the seat portion such that the seat is permitted to move fore and aft and in up and down directions in response to forces imparted thereto; and first restraint means (50,54), for restraining the seat during an emergency from moving forward from its pre-emergency position, the first restraining means being mounted behind and remote from the seat and the support means at a height generally equal to the height of a bottom portion of the seat cushion above the floor, and comprising a spring biased reel, and a flexible member (42) wound thereon, an end of the flexible member extends from the reel and is connected to the seat, the spring biased reel maintaining the flexible member in a generally taut condition as the seat moves and locking means is activated during an emergency for preventing protraction of the flexible member from the reel.

2. The system as defined in claim 1 wherein the flexible member (42) is a one of a length of cable and seat belt webbing and wherein the second means includes a clamping means (54, 130) for clamping upon the cable and webbing.

3. The system as defined in claim 1 wherein the clamping means is electrically activated.

* * * * *